United States Patent [19]

Thomas et al.

[11] 4,390,777
[45] Jun. 28, 1983

[54] FUSION WELDING PROCESS

[75] Inventors: Kenneth C. Thomas, Export; Eric D. Jones, Salem; Marvin A. McBride, Hempfield Township, Westmoreland County, all of Pa.

[73] Assignee: The United States of America as represented by the United States Department of Energy, Washington, D.C.

[21] Appl. No.: 245,487

[22] Filed: Mar. 19, 1981

[51] Int. Cl.³ ............................................. B23K 9/23
[52] U.S. Cl. ............................ 219/127; 219/137 WM
[58] Field of Search ........... 219/137 R, 137 WM, 127

[56] References Cited

U.S. PATENT DOCUMENTS

| | | |
|---|---|---|
| 1,762,483 | 6/1930 | Norwood . |
| 1,884,714 | 10/1932 | Jerabek ............................ 219/137 R |
| 2,031,138 | 2/1936 | Taylor ............................. 219/137 R |
| 3,035,158 | 5/1962 | Copleston . |
| 3,082,315 | 3/1963 | Johnson . |
| 3,204,083 | 8/1965 | Iromm . |
| 3,333,319 | 8/1967 | Taylor . |
| 3,511,646 | 5/1970 | Scheele ....................... 219/137 WM |
| 3,716,691 | 2/1973 | Baybrook ................... 219/137 WM |
| 3,789,184 | 1/1974 | Piepers . |
| 4,163,869 | 8/1979 | Almand . |

Primary Examiner—Elliot A. Goldberg

[57] ABSTRACT

A process for the fusion welding of nickel alloy steel members wherein a ferrite containing pellet is inserted into a cavity in one member and melted by a welding torch. The resulting weld nugget, a fusion of the nickel containing alloy from the members to be welded and the pellet, has a composition which is sufficiently low in nickel content such that ferrite phases occur within the weld nugget, resulting in improved weld properties. The steel alloys encompassed also include alloys containing carbon and manganese, considered nickel equivalents.

1 Claim, 5 Drawing Figures

U.S. Patent  Jun. 28, 1983  Sheet 1 of 2  4,390,777
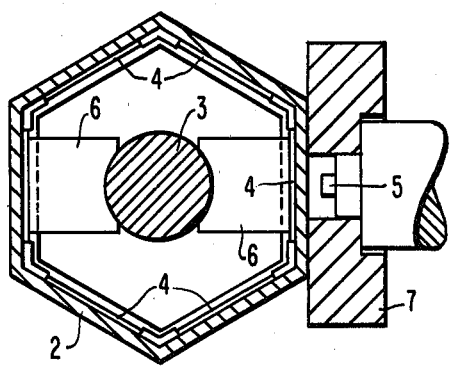
FIG. I
PRIOR ART
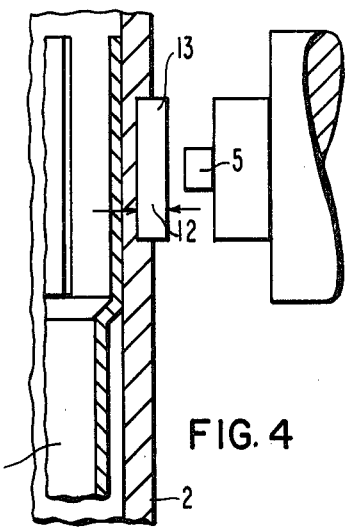
FIG. 4
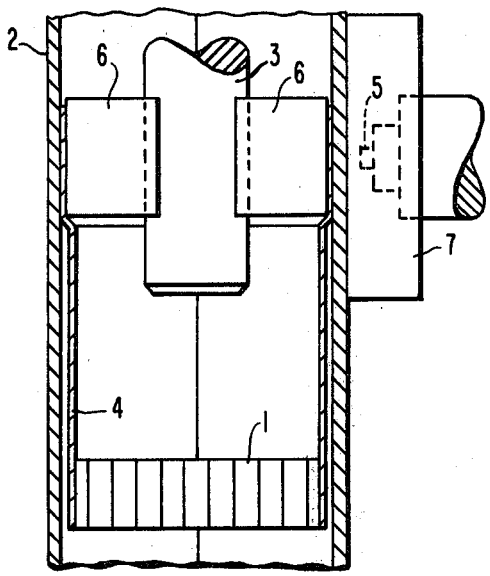
FIG. 2
PRIOR ART
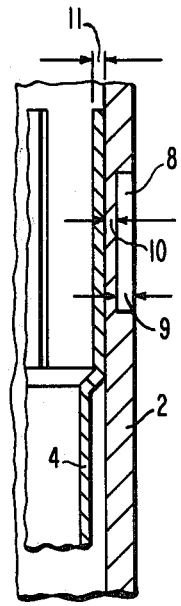
FIG. 3

FUSION WELDING PROCESS

GOVERNMENT CONTRACT

This invention was conceived during performance of a contract with the United States Government, designated DE-AM02-76-CH94000.

BACKGROUND OF THE INVENTION

This invention relates to a new process for joining two nickel containing alloy members together by fusion welding, particularly the joining of fuel assembly grids and ducts composed of nickel-bearing stainless steel.

The construction of fuel assemblies for sodium cooled fast breeder reactors requires the joining of spacer grid members to a duct member. This joining is usually done by a well-known gas tungsten arc welding process (GTAW) in which the two members are joined at a point where the metal of each is locally melted. The members are fused together upon solidification of the metal at the weld location to form a common weld nugget.

The melting and solidification process offers opportunity for the microstructure of the metal to change at the site of the weld. Of particular concern is the possible formation in the weld nugget of phases of the alloy which do not include significant amounts of ferrite, a lack which is known to cause poor weld characteristics.

A fuel assembly duct member is a long six-sided tube with wall thickness typically 0.040 inches. The grid member (0.015 inches thick) must be located within the duct at locations of difficult accessibility. The grid member is usually clamped to the duct member, and the welding electrode is applied to the outside wall of the duct member. Thus, the welding process requires the welding electrode to melt entirely through the thickest work piece (the duct member) and partially into or completely through the thinnest work piece (the grid member) to achieve a suitable weld nugget.

Recently, the designs for the duct and grid members specify alloys containing higher amounts of nickel. Attempts to weld this material using the GTAW process result in poor fusion, cracking, and insufficient weld strength. The problem is due to the insufficient formation or absence of phases of ferrite content in the weld nugget.

Consequently, it is desired to provide a welding process which can be used to accomplish the welding of nickel-bearing steel alloy members which do not normally exhibit formation of ferrite phases in the microstructure of the weld nugget.

SUMMARY OF THE INVENTION

The invention is a welding process for nickel alloy members wherein a flat-bottomed hole is first machined partially through a first member and a pellet fitted snuggly therein. The pellet is composed of material containing a balance of elements such that adequate amounts of ferrite are formed during welding. When melted by the welding torch, the pellet material becomes part of the weld nugget by fusion with the nickel bearing metal melted from the members to be joined. It is found that with proper selection of the pellet material, the formation of ferrite phases in the weld nugget is enhanced, resulting in improved weld properties.

BRIEF DESCRIPTION OF THE DRAWINGS

FIG. 1 is a plane view of a fuel assembly duct prepared for welding, grid pattern details are omitted for clarity;

FIG. 2 is a section of the assembly of FIG. 1 with the grid location illustrated;

FIG. 3 is a detailed view of the weld site, taken as indicated from FIG. 2;

FIG. 4 is a detailed view of the weld site which shows the installed pellet;

DETAILED DESCRIPTION OF THE INVENTION

Figure 5:
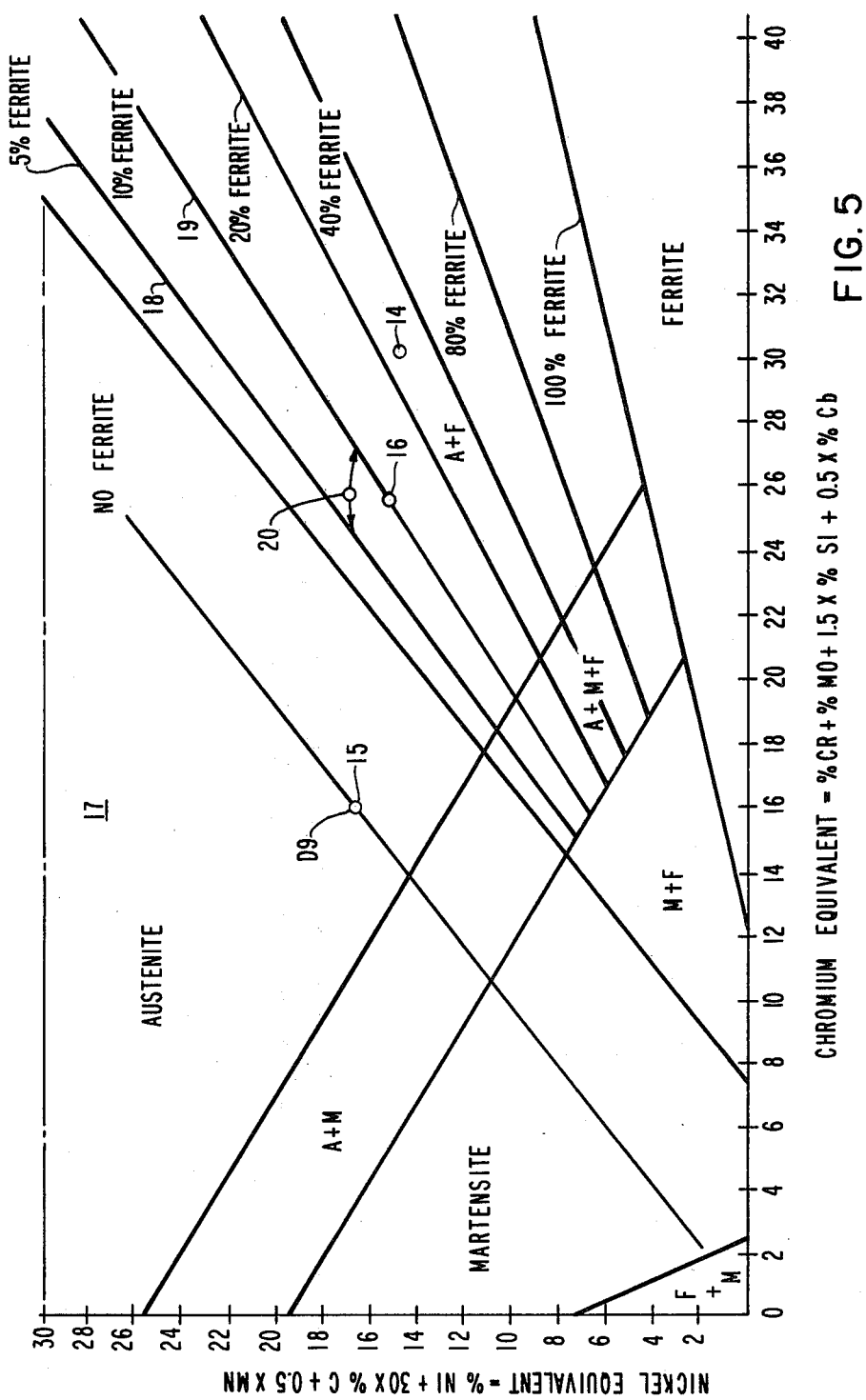
FIG. 5 is a constitution diagram which indicates the compositions of weld material.

The invention will be described in the context of the fusion welding of a fuel assembly duct and grid components.

Refer to FIGS. 1 and 2. A grid 1 is shown held in a proper welding position within a duct 2 by an expanding clamp 3. The grid 1 has a plurality of support straps 4 which will support the grid within the duct in the fuel assembly. The welding method to be described is intended to accomplish the welding of the support straps 4 to the duct 2.

The duct 2 wall thickness is approximately 0.040 inches while the support strap 4 thickness is 0.015 inches. The duct 2 is an axially long hexagonal channel which makes welding torch access to the site of the grid 1 within the duct 2 difficult to achieve. The usual practice is to do the welding from outside the duct 2, as shown in FIGS. 1 and 2 wherein the welding torch 5 is shown on the outside of the duct 2.

The clamp 3 may be provided with a heat sink 6.

The welding torch 5 may be positioned and guided by torch guide means 7.

This invention relates to a range of austenitic materials of which the support strap 4 and the duct 2, the members to be joined together by welding, may be composed. The material may be an alloy of nickel and other elements producing alloys for which FIG. 5 is applicable, as explained hereinbelow. The position of an alloy in FIG. 5 is determined by its "nickel equivalent" and its "chromium equivalent". These equivalents are determined by:

I. Nickel Equivalent $(\%) = \%Ni + 30 \times \%C + 0.5 \times \%Mn$

II. Chromium Equivalent $(\%) = \%Cr + \%Mo + 1.5 \times \%Si + \%Cb$

The members to be joined together are considered within the scope of this invention if the material of composition of these members includes significant amounts of nickel or includes a significant amount of "nickel equivalent" as determined by Equation I and consequently lies within the austenite region 17 as shown in FIG. 5. The chromium equivalent may be as low as zero %. This nickel or nickel equivalent content in the members is believed to cause the welding problems described above by reducing the formation of ferrite phases in the weld nugget.

An example of material for the members to be welded by this method is "D9", a composition of 13% Cr, 15% Ni, 0.05% C, 1.5% Mo, 1.8% Mn, 0.25% Ti, 1% Si, balance Fe, shown in FIG. 5 at point 15. If welded by conventional means, poor welds result.

Refer to FIG. 3. The figure is an enlargement of the site of the proposed weld as indicated in FIG. 2. Prior to attempting the weld, a flat-bottomed hole 8 is machined in the duct 2 from the side facing the welding torch 5. The depth of this hole, depth 9, is chosen such that the thickness 10 of the remaining duct wall, approximately equals the support strap thickness 11. Experimental work indicates this configuration yields the best weld results, because the material left at the bottom of the hole maintains pressure boundary integrity if the weld is inadvertently never performed, or is otherwise misaligned or only partially accomplished. A hole 8 which is completely through the first member, even containing a pellet, would allow sodium leakage through the first member if the weld was incomplete, in a fuel assembly for a sodium-cooled reactor. Table I contains the dimensions applicable to a present design of these components for a fuel assembly embodiment.

Refer to FIG. 4. This figure shows the next step in the process which is to seat a pellet 13 inside the hole 8. The size and shape of the pellet 13 is chosen to give a tight fit in the hole 8. The pellet height 12 may be greater than the hole depth 9, equal to hole depth 9, or less than hole depth 9, depending on whether it is desired that the final weld surface be respectively convex upward, flat, or concave downward.

Choice of the pellet 13 is made with reference to FIG. 5. It is intended that the final weld nugget be composed of material lying between the 5% ferrite line 18 and the 10% ferrite line 19. A proper pellet material is one which lies in a position in FIG. 5 such that, in view of a mass balance of the first and second members and the pellet mass, considering the actual mass contributions of each to the final weld nugget and the nickel and chromium contents of each, the weld nugget lies in the 5% to 10% range. According to the choice of the pellet material, a shifting of the weld material along the chromium equivalent axis or the nickel equivalent axis, or both, may be accomplished.

The pellet material choice process is best illustrated by a definite example. It is desired to choose a pellet material for the welding of D9 members. Applicable dimensions are as given in Table I. It is seen that the welding process must result in the melting into the weld nugget of a material which is located to the right of the center 20 of the 5% line 18 to 10% line 19 range about three-fifths of the distance of points 15 (D9) to the left of the same center 20 since the pellet material mass is about five thirds of the D9 nugget mass. (The support strap thickness plus remaining duct wall thickness is 0.03 inch while the pellet height is 0.05 inch.) Point 14, which corresponds to a Type 312 stainless steel (SS) consisting of 30% Cr, 9% Ni, 2.5% Mn, 0.9% Si, 0.15% C, and 57.45% Fe, is chosen as a likely pellet material.

In fact, experimental results using a Type 312 SS pellet on D9 members all of Table I dimensions yield weld material located at point 16 in FIG. 5 which lies on the 10% ferrite line 19. Good weld characteristics result.

TABLE I

| | |
|---|---|
| Duct wall thickness | .040 inch |
| Support strap thickness | .015 inch |
| Hole depth (9) | .025 inch |
| Thickness of remaining duct wall (10) | .015 inch |
| Pellet diameter | .200 inch |
| Pellet height (12) | .050 inch |

The pellet 13 may be adapted to serve as a guide for the welding torch 5 by means of a center hole in the pellet 13 or beveled surfaces on the pellet 13.

The clamp 3 and the torch guide means 7 or other component is used to apply a mechanical pressure on the support strap 4 and duct 2, holding these together. The welding torch 5 melts the pellet 13, the metal of the duct 2 through thickness 10 in FIG. 3 and some of the metal of the support strap 4. When this melted pool cools and solidifies, a fusion weld of good properties results.

The application of this welding method is not limited to nuclear fuel assemblies, or even to the welding of thick and thin members from the side of the thick member, but may also be utilized in any circumstance in which it is desired to weld members composed of nickelrich or nickel equivalent rich material.

While in the foregoing a general invention has been described, it should be understood that various changes and modifications may be made without departing from the true spirit and scope of the invention. For example, the hole and pellet may obviously have various geometric shapes. Therefore, the foregoing should be interpreted as illustrative rather than limiting.

What is claimed is:

1. In a method of fusion welding an austenite metal member to the inside surface of an elongated austenite metal duct by securing the metal member against the inside surface of the duct wall and by applying fusion welding means to the outside surface of the duct wall, the improvement comprising forming a hole from the outside surface partway through the wall of the duct in alignment opposite the metal member secured therein,
   affixing a metal pellet containing ferrite of sufficient nickel and chromium equivalence to form on fusion with the austenite metal member and duct an alloy including about 5–10% ferrite; and
   fusing the austenite metal duct wall, austenite metal member and pellet together through application of fusion welding means outside said duct to form said weld including ferrite alloy.

* * * * *